Figure 4:
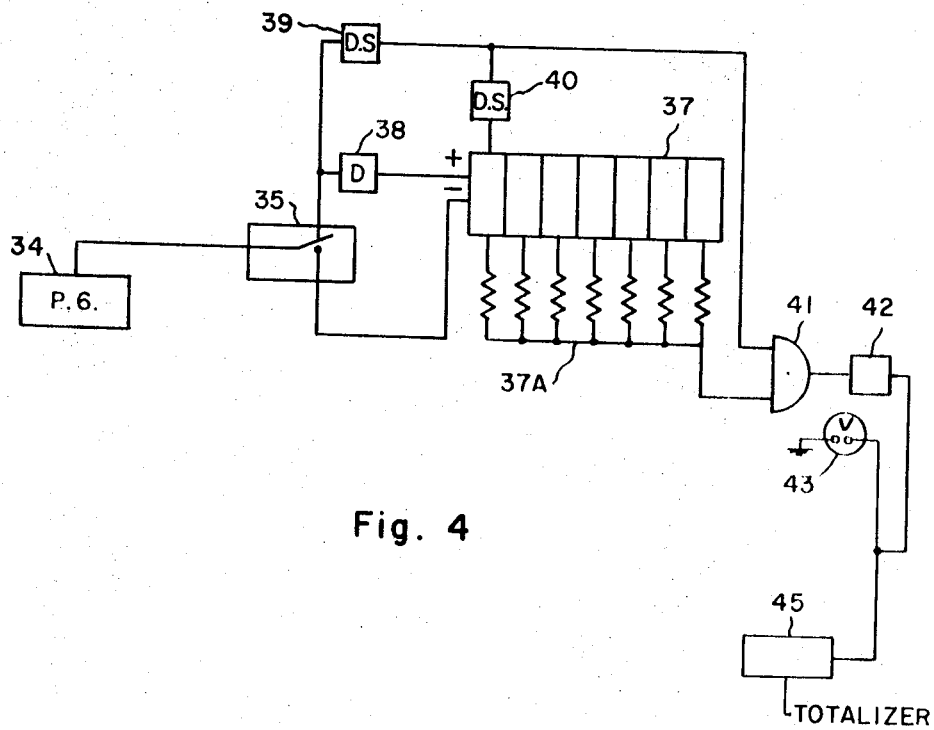

United States Patent

[11] 3,580,083

| [72] | Inventor | Frederick S. Zipser |
| | | 32 S. Broadway, Red Hook, N.Y. 12571 |
| [21] | Appl. No. | 784,859 |
| [22] | Filed | Dec. 18, 1968 |
| [45] | Patented | May 25, 1971 |

[54] SPEED-MEASURING DEVICE
6 Claims, 9 Drawing Figs.

[52] U.S. Cl.................................................... 73/432R,
235/1R, 235/92DN, 235/92PK, 272/69
[51] Int. Cl..................................................... G01l 3/00,
G01l 5/02
[50] Field of Search............................................ 73/432
(SD); 235/91, 10, 92, 105; 272/57, 69, 74;
200/86.5

[56] References Cited
UNITED STATES PATENTS

| 1,919,627 | 7/1933 | Fitzgerald...................... | 272/69 |
| 2,910,231 | 10/1959 | Hechler......................... | 235/92 |
| 3,419,732 | 12/1968 | Lane............................. | 272/57 |
| 3,434,659 | 3/1969 | Ham et al...................... | 235/91.10 |

Primary Examiner—Louis R. Prince
Assistant Examiner—Daniel M. Yasich
Attorney—Daniel M. Rosen ABSTRACT: A device for measuring the rate of speed or distance covered by a person moving or running in place including a generator producing an electrical pulse each time a footfall is made, a device for calculating the rate at which the pulses occur, and a device for indicating the calculated rate. For distance measurements, a preset distance-factoring device can be adjusted so as to provide an indication of the distance covered between successive electrical pulses in accordance with the characteristic of the moving individual, and a counting device for counting up the number of electrical pulses in accordance with the factor. In an alternative embodiment, high-frequency generators can be used along with a counting device for digitally accumulating electrical pulses in accordance with the interval between footfalls; and a device for producing an electrical pulse amplitude in accordance with the number of pulses representing the intrafootfall spacing, and indicating the rate and distance covered thereby.

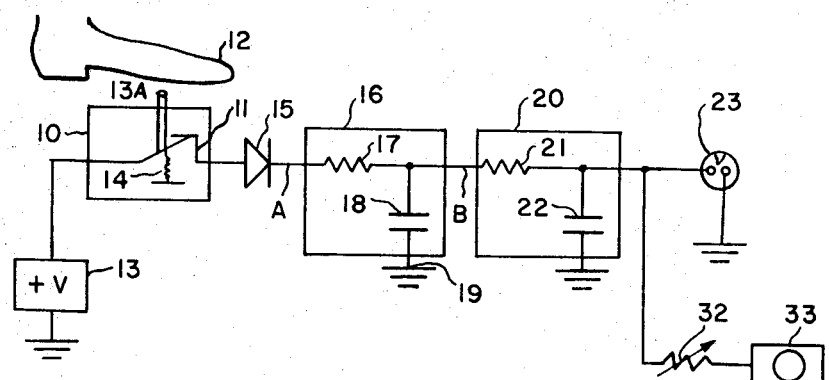
Fig. 1
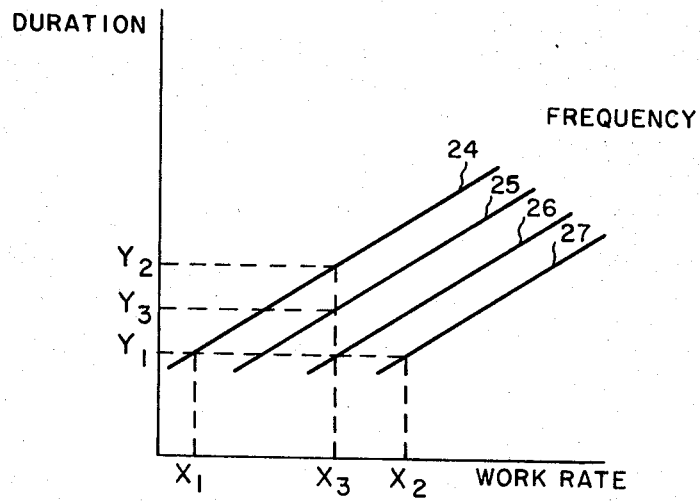
Fig. 2
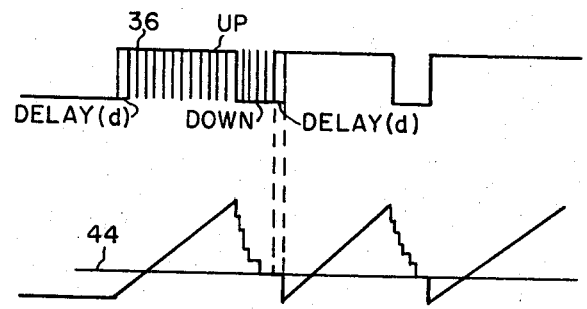
Fig. 5a
Fig. 5b
INVENTOR.
FREDERICK S. ZIPSER
BY
ATTORNEY

INVENTOR.
FREDERICK S. ZIPSER

BY

ATTORNEY

SPEED-MEASURING DEVICE

This invention relates generally to work-indicating devices and particularly to a device for effectively measuring the energy expended by running in place.

One of the most effective forms of physical exercise, at least in terms of improving cardiovascular efficiency, is that of jogging. Jogging, or running at a measured pace, can be done at all ages, by both sexes, and can be gauged to coincide with one's particular degree of physical fitness. It requires no expensive or extensive equipment, and does not involve a great degree of time. However, jogging does require the availability of suitable indoor or outdoor running space.

Availability of running space may at times present difficulty, particularly to those in urban areas, or at times of inclement weather or during an inconvenient time of day, etc. It is therefore desirable to be able to substitute or at times supplement a jogging activity by a less demanding and more available form of exercise.

Such a form of exercise would be running in place. However, the difficulty with running in place, from a point of view of gauged exercise, is that there is no simple or direct way of gauging one's expenditure of energy so as to form an accurate comparison to an actual jogging activity. Further, running in place does not lend itself to easy measurements as in jogging where one can easily tell distance covered and can easily calculate speed as in miles per hour, feet per second, in terms of terrain characteristics or the like.

Devices currently employed for the measurement of in place running are bulky and expensive. For example, a common type of mechanism is a treadmill either with or without an electric motor and which contains a surface suitable for running in place. Such devices are inconvenient for the private user in the home.

The need therefore exists for a simple mechanism which will enable a person running in place to know his work or energy expenditure. With such information, the runner can gauge his efforts so as to gradually increase exercise over a period of weeks or months and so as to generally improve his health and endurance in measurable levels. Further, being able to run indoors without the use of bulky and inconvenient equipment at measurable quantities is also advantageous. A simple measuring device can also find general utility in the field of medicine, particularly cardiology, both in discovering latent cardiac conditions and rehabilitating known cardiac patients. Use of such a device would enable the doctor to accurately prescribe the exact amount of exercise he wishes his patient to have each day and can increase the amount of exercise prescribed by a predetermined increment over a predetermined period of time as desired. Furthermore, the use of a simple and compact piece of equipment to enable a doctor to gauge the amount of cardiovascular activity which can be generated by predetermined gauged rates of exercise without the need for large and bulky equipment would be extremely desirable.

The primary object of this invention is therefore to provide a novel and unique mechanism for enabling a runner to accurately gauge the amount of work done by running in place.

It is a further object of this invention to provide a simple, novel and unique mechanism for measuring the velocity equivalent or distance equivalent of running in place.

The invention primarily concerns itself with measurements automatically taken on a person running in place and from these measurements to automatically calculate and display distance and speed that he would have run had he actually been jogging for the same length of time and with approximately the same expenditure of energy. The measurements may be taken on both feet, however, it has been found that measurements taken on one foot are as accurate in that they represent a proportional indication of the amount of work being done. It has been found that the following measurements provide the operating parameters necessary to establish running in place measurement: (1) The number of steps per unit of time; (2) The length of time that one foot is on the ground, or its reciprocal, length of time the one foot is off the ground; (3) The total length of time that the person is running in place.

It has also been discovered that the relationship between work or energy expended in the sense of the extent of employment of the cardiovascular facility, remains proportional to the factor of number of steps per minute and the effort expended with each step. The latter is determined by the time the foot is off the ground, or its reciprocal. Thus, the amount of work done will be proportional to the foot time up or down and the number of steps taken per unit time. The actual factors taken into account are those representative of the duration between successive steps and the frequency of the steps.

In an operative embodiment of the invention, an indication of work rate is established by measuring the duration and frequency of the step rate at which a subject is moving or running in place. This measurement is made by way of a foot-operated switch connected electrically between a source of energy and a calculating device which can establish the running rate while taking into account the actual number of steps per unit time. This calculator can take the form of a simple capacitive storage device which responds to the duration and frequency of the electrical pulse rate produced by the repetitive operation of the foot switch. An indication of simulated distance covered can be obtained by counting the repetition rate and multiplying it by a factor determined by the subject. In another form, a digital counter can be responsive to both of the factors of pulse duration and pulse frequency to provide the work indication on an analog scale.

The foregoing objects and description as well as further objects will become apparent from the following description of various embodiments of the invention, taken in connection with the various FIGS. wherein FIG. 1 is a simplified illustration of a block diagram of the invention, FIG. 2 illustrates the relationships between pulse rate, pulse frequency and pulse duration, FIGS. 3a, 3b, 3c and 3d illustrate the operation of FIG. 1 for various rates, FIG. 4 illustrates a further embodiment of the invention and FIGS. 5a and 5b illustrate operating wave forms for the embodiment of FIG. 4.

The arrangement of FIG. 1 illustrates a foot-operated switch 10 having a set of contacts 11. For purposes of explanation a foot 12 is illustrated and acts to block passage of a voltage from a source of energy 13 such as a battery by cooperating with a plunger 13a which acts to break contacts 11 when depressed. Absence of pressure causes a spring 14 to restore the contact. The source 13 supplies a positive voltage which passes through the diode 15 and the point A to a capacitive storage device 16 having an output point B. The storage device 16 is illustrated as including a series resistor 17 and a shunt capacitor 18 terminated at a reference or ground point 19. The device 16 has a time constant which takes the range of possible pulse frequencies into account as will be explained further below. A filtering device 20, having a series resistor 21 and a shunt capacitor 22 filters the output of the storage device 16 and the filtered signal is passed through to the meter 23 which measures the amplitude of the resultant signal with respect to the reference point of ground.

The embodiment of FIG. 1 produces signals at point A having a dual characteristic: a duration, depending upon the length of time that the foot 12 is off the ground; and a frequency depending upon the number of pulses (or steps taken by foot 12) per unit of time. The principle of operation of the arrangement of FIG. 1 is demonstrated by the graphical relationship of FIG. 2 which shows the duration and frequency as functions of the rate. The rate is the effective measurement of work done. Pulse as used herein refers to the electrical pulses produced in accordance with each footfall. The duration axis is a relative measure of the pulse duration each time the foot is off the ground, as between steps. The frequency is the number of steps per unit of time. Thus, for example, curves 24, 25, 26 and 27 of FIG. 2 can each represent a stepping rate of, for example, 70, 80, 90 and 100 steps per minute respectively. Duration actually represents the effort involved in reaching a given number of steps per minute, as by the amount of knee-lift used at a given frequency. The rate curves 24, 25, 26, 27 translate themselves and the durations corresponding thereto to an equivalent rate or work. Thus, for example, assuming a low duration (uptime between steps) $Y_1$, at the lowest frequency curve 24 (70 steps per minute), a low work rate $X_1$ is developed. If the same duration is maintained, but a higher frequency attained (100 steps per minute) a much higher work rate $X_2$ is achieved. If a higher duration $Y_2$ is reached, but with a low frequency 24 (70 steps per minute) a higher work rate $X_3$ is achieved. The rate line $X_3$ however passes through the curves 25 and 26 at duration points $Y_3$ and $Y_1$, and thus indicates that the same work is done at duration $Y_2$ and frequency 24, duration $Y_3$ and frequency 25, and at duration $Y_1$ and frequency 26. Actual measurement of cardiovascular activity has shown the foregoing correlation to be substantially accurate: the heart-lung activity of a person running in place is dependent upon the duration and frequency factors generated in the manner discussed above.

Figure 3A:
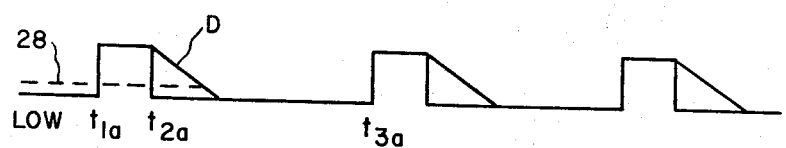
Figure 3B:
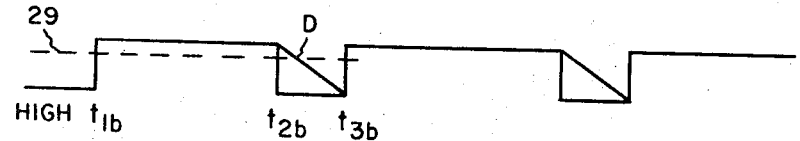

The arrangement of FIG. 1 produces the required duration and frequency factors. Referring to FIGS. 3a—d, a first frequency, or number of steps per minute, is illustrated for two differing rates shown respectively in FIGS. 3a and 3b. These rates can, for example, be represented by the points $X_1$ and $X_3$ on the constant frequency line 24. A low rate, FIG. 3a, is characterized by a relatively short duration time $t_{1a}$—$t_{2a}$, whereas a higher rate, FIG. 3b is represented by a longer duration time $t_{1b}$—$t_{2b}$. The frequency of $t_{1a}$, $t_{3a}$ and of $t_{1b}$, $t_{3b}$, is the same for both rates. The waveforms of FIGS. 3a and 3b are representative of the signal appearing at point A in FIG. 1. Since a signal is produced during the switch off time via switch 10, an output pulse having a magnitude +V and a length determined by the duration of the off time will appear at the point A. The first circuit 16 is designed to have a time constant which will cause a pulse decay of the output pulse appearing at the point B, FIG. 1, at a fixed rate, shown generally as the decaying trailing edge D of each pulse in FIGS. 3a—d. A further circuit 20 averages the resulting waveforms to produce a smoothed average output level. For the curve FIG. 3a, the average output level 28 will be low. For the curve of FIG. 3b, the average output level 2a will be somewhat higher. By placing a suitable magnitude indicating device 23 at the output of the arrangement, an indication of the output level can be obtained. Since the varying output levels appearing at 23 will be representative of varying levels of effort, the output 23 can be scaled in terms of an equivalent velocity or running rate, such as feet per second, or miles per hour.

Figure 3C:
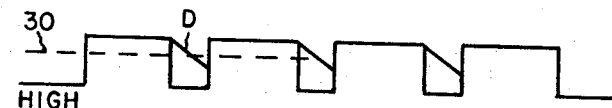
Figure 3D:
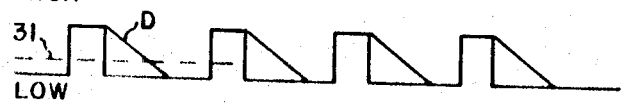

An additional example is illustrated in FIGS. 3c and 3d. A high-effort rate, FIG. 3c, produces a high average signal 30. A low effort rate, FIG. 3d, will result in a low average signal 31. Both FIG. 3c and 3d rates are at the same frequency, although both are at a higher frequency than that shown in the waveforms illustrated in FIGS. 3a and 3b. In both frequencies, the decay rate D, determined by the time constant of the RC components in the circuit 16 remains the same and can be preset or adjusted for the range of speeds covered by a user.

The circuits and components of FIG. 1 are designed so as to be responsive to signal characteristics as shown in FIGS. 3a-—d. The foot-operated switch 10 can take any suitable form, such as a floor mat, or a switch connected to the foot and can operate photoelectrically, mechanically, capacitively or the like.

Once a magnitude representative of speed is achieved, a simple conversion based upon the duration of the speed can result in a measurement of the equivalent distance which would have been traversed by an individual actually running. This conversion would entail a factoring device 32 responding to the output signal of the arrangement of FIG. 1. This device 32, which can be a variable resistor, is scaled to correspond to the user's length of stride and thus allows an indicator 33, such as a counter, to count units in either feet or miles, or as desired, thereby representing the equivalent of the total running distance covered.

A further and more sophisticated form of the invention appears in FIGS. 4 and 5a—b. Here, the pulse duration and frequency factors are converted into a number of high-frequency pulses proportioned to the time duration of the two factors, and combined to produce a resultant electrical magnitude corresponding to speed. The latter can again be converted to distance. The embodiment of FIG. 4 shows a pulse generator 34 which generates a relatively high-frequency pulse series, of the order of kilocycles, through a pressure-operated switch 35. The output signal 36 (FIG. 5a) of the generator and switch is an envelope of high-frequency pulses which has a duration in accordance with the length of time that pressure is not present on the switch 35. This would correspond to the "up" time of each step; the time the foot is off the ground during running in place. During this period, the pulses are conducted to the forward counting terminal of a multistage forward-backward digital counter 37 through a delay circuit 38. The "down" time of each step results in the "down" pulse envelope, FIG. 5a, being conducted to the backward counting terminal of the counter 37. The up envelope is also conducted to a one-shot multivibrator 39, triggering same, which in turn produces a short duration pulse, for triggering a second one-shot multivibrator 40 which in turn serves to produce a pulse for resetting the counter 37, and for triggering and AND gate 41. The AND gate, which produces an output upon a coincidence of inputs on all of its input lines, and thereby termed a coincident gate, also receives an input from the weighted resistor network 37A connected to each stage of the counter 37. The network 37A can be weighted in binary progression as is conventional in converting the state of a digital signal to a corresponding electrical magnitude. The AND gate 41 output is filtered through a conventional filter 42 and indicated by means of a meter 43. In operation, a running in place subject activates the system and begins running in place with one foot falling on the switch 35. The up time produces the up envelope which produces a count in the counter, after an initial delay d, proportional to the time up. The down envelope reduces the count, by an amount proportional to the time between pulses, as shown in FIG. 5b. During the delay period, the one shot 39 activates the gate 41 and a signal 44 having a magnitude proportional to the remaining signal stored in the counter 39 is conducted through a smoothing filter 42 to the meter 43. Later, but still during the delay period, the second one shot 40 responds to the end of the pulse from the first one shot 39 to produce a clear pulse connected to a clear terminal on the counter 37 for clearing the counter and which allows the next cycle to begin in the counter. Since the meter 43 is measuring a work indication, the meter can be scaled for speed and a totalizer 45, or distance circuit, as described in connection with FIG. 1, can be employed. The forward-backward counter, resistance matrix, one-shot and delay circuits are all conventional components such as are described in "Analog Computation" by Albert S. Jackson, published 1960 by McGraw Hill Book Company, Inc., and in "Pulse Digital Circuits" by Millman and Taub, published 1956 by McGraw Hill Book Company, Inc.

Since certain changes and modifications can be readily entered into in the practice of the present invention without departing substantially from its intended spirit or scope, it is to be fully understood that all of the foregoing description and specification be interpreted and construed as being merely illustrative of the invention and in no sense or manner as being limiting or restrictive thereof excepting as it is set forth and defined in the appended claims.

I claim:
1. A foot-operable work rate indicator comprising a source of energy, a foot-operated switch connected to said source and responsive to the repetitive application of foot pressure applied to said switch for generating a series of pulses from said source, said series of pulses providing a signal having a dual characteristic of duration and frequency corresponding to the energy expended by said repetitive application of foot pressure, means coupled to said switch and responsive to said dual characteristic signal for generating a work rate signal having a magnitude representative of work rate corresponding to said energy expended during said repetitive application of foot pressure, and means for indicating said work rate signal.

2. A foot-operated work rate indicator comprising a pressure operable switching means adapted to change from a conductive to a nonconductive condition in direct response to the repetitive application of foot pressure, a source of potential, means serially connecting said source to said switching means, said source and said switching means together producing a series of pulses each having a duration representative of the length of time said foot pressure is not incident upon said switching means and having an interpulse spacing indicative of the time duration of incident foot pressure, said series of pulses providing a signal having a dual characteristic of duration and frequency corresponding to the energy expended by said repetitive application of foot pressure, converting means coupled to said switching means and responsive to said series of pulses for converting said dual characteristic signal into a signal having an amplitude corresponding to said energy expended, and indicating means connected to said converter and responsive to said signal amplitude for providing an indication of the rate of application of said repetitive application of foot pressure.

3. The combination of claim 2 wherein said converting means includes a storage circuit and a discharge path, said storage circuit responsive to the interpulse spacing for building up a charge level corresponding with said interpulse spacing, said discharge path including therein means for developing a signal thereacross representative of said charge level, and means connecting said developed signal to said indicating means.

4. A foot-operable work rate indicator for measuring the work effort expended by the running effort of a subject in accordance with the repetitive characteristic of each step, comprising a source of relatively high-frequency pulses, a foot-pressure-operated switch connected to said source and having first and second positions passing an envelope of said pulses in response to a nonpressure and pressure on said switch respectively, a counter having forward and backward counting terminals and operable to count forward or backward at a rate in accordance with pulses of said envelope applied to either said forward terminal or said backward terminal thereof, said counter having said forward counting terminal connected to said first switch position for receiving the envelope of pulses when said switch is in its first position and said backward counting terminal connected to said second switch position for receiving the envelope of pulses when said switch is in its second position, delay means for delaying application of said first position pulses to said counter for a delay period, said counter accumulating a digital accumulation in accordance with the total of the first position pulses reduced by the second position pulses, a network means responsive to the digital accumulation in said counter for producing a signal amplitude corresponding to said digital accumulation at the end of said second position pulses, a coincident gate having a first input responsive to said network means signal, a first pulse producing means for producing a pulse during said delay period for energizing the remaining input of said coincident gate, a second pulse producing means responsive to the end of the pulse from said first pulse-producing means for producing a second pulse during said delay period for clearing said counter and means responsive to the magnitude of the output signal from said gate for providing an indication thereof, said signal constituting a measurement of said work rate.

5. A foot-operable rate indicating device comprising a source of energy, first means responsive to the repetitive application of foot pressure for repetitively switching said source of energy on and off in correspondence with said foot pressure, thereby generating a series of pulses, said series of pulses providing a signal having a dual characteristic of duration and frequency corresponding to the energy expended by said repetitive application of foot pressure, said frequency represented by an interpulse spacing characteristic, second means connected to said first means and responsive to said pulse duration characteristic and to said interpulse spacing characteristic for providing a rate representative signal having a magnitude representative of the effect of both of said characteristics, and third means connected to said second means and responsive to said rate representative signal magnitude for providing an indication of said signal magnitude.

6. A foot-operable rate indicator for equating work energy exerted with an equivalent velocity rate, comprising a source of energy, switching means coupled to said source of energy and responsive to repetitive application of foot pressure thereon created by running in place, said switching means thereby operable to produce a series of pulses from said source having a duration factor and a frequency factor, said factors together corresponding to the energy exerted by said repetitive application of foot pressure, averaging means coupled to said switching means for combining said factors and averaging said series of pulses to a signal having a magnitude corresponding to the combined effect of both said duration and said frequency, said magnitude thereby providing a representation of the effort exerted corresponding to a predetermined equivalent velocity rate, and indicating means connected to said averaging means for providing a visual indication of said velocity rate.